Feb. 11, 1936.  J. L. GALLUP  2,030,200
CERAMIC OBJECT AND METHOD OF MAKING THE SAME
Filed March 30, 1934
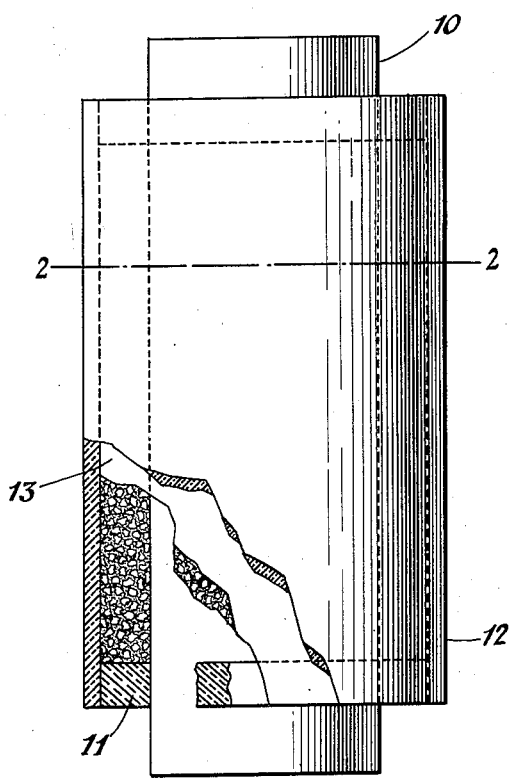
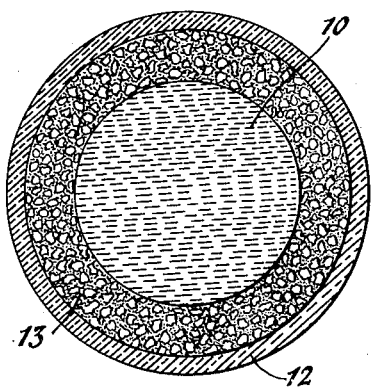
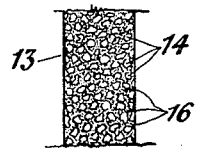
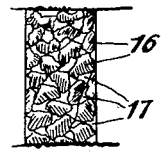
INVENTOR
JOHN L. GALLUP
BY
ATTORNEY Patented Feb. 11, 1936

2,030,200

UNITED STATES PATENT OFFICE 2,030,200

CERAMIC OBJECT AND METHOD OF MAKING THE SAME

John L. Gallup, Newark, N. J., assignor to Radio Corporation of America, a corporation of Delaware Application March 30, 1934, Serial No. 718,163

5 Claims. (Cl. 25—156)

My invention relates to ceramic objects and more particularly to tubes of substantially pure coherent alumina for use in high temperature furnaces and to a method of making the same.

Cylindrical objects, such as tubes, are usually made from ceramic materials, either by casting a fluid suspension of the material in an absorbent mold of plaster-of-paris, or by pressing the material in a steel mold by means of a plunger. In the casting method the material must remain in suspension in a fluid while the absorption of the fluid by the walls of the mold builds up a layer of suspended material on the walls. Alumina and other non-plastics will not remain in suspension in the fluids generally used, but must be floated by large amounts of a colloidal suspending agent, such as clay, so that a tube of pure alumina cannot be made by casting. The pressing process requires expensive presses and molds and is apt to set up in the pressed tube strains which may cause it to warp and fail prematurely in service at high temperatures. Casting is simpler and less expensive than pressing and is the more desirable method, but is objectionable because of clay or other impurities which are necessarily mingled with the alumina, hence a pure alumina tube cannot be made by casting.

An object of my invention is to provide objects of substantially pure coherent alumina and a novel and inexpensive method of making the same.

In accordance with my invention I prepare from water and alumina of particles of different sizes of predetermined gradation, a slip just thin enough to pour, and pour the slip into an annular mold having a smooth surfaced cylindrical core and a tubular shell preferably of water absorbent material, such as pasteboard, concentric with the core. After the slip has dried sufficiently to become rigid the core is withdrawn and the alumina tube, supported by the shell is placed in a furnace and fired for a sufficient time and at a temperature high enough to make the alumina tube strong and coherent. This procedure produces a compact alumina tube easily and cheaply made and substantially free from foreign binding material with the particles of alumina apparently sintered.

The novel features which I believe to be characteristic of my invention are set forth with particularity in the appended claims, but the invention itself will best be understood by reference to the following description taken in connection with the accompanying drawing in which,—

Figure 1 is a side elevation of an apparatus which may be used to form a tube according to my invention, some parts being broken away to show details of construction.

Figure 2 is a horizontal cross-section taken on line 2—2 of Figure 1.

Figure 3 is a greatly enlarged view of a small section of a tube made in accordance with my invention.

Figure 4 is a greatly enlarged view of a small section of the ordinary commercial alumina tube.

In accordance with my invention the slip from which the tube is made comprises a mixture of large and small particles of alumina, preferably what is commercially known as bauxite ore concentrate. The large particles will pass thru a 100 to 200 mesh screen, measure from 75 to 100 microns across, and constitute substantially 80% of the mixture while the small or fine particles, constituting the remainder, will easily pass thru a 325 mesh screen and measure from 2 to 8 microns across. Enough water is added to make a slip which is just thin enough to pour. While the ratio of 80% large particles to 20% small particles results in the strongest tubes, commercially satisfactory tubes can be made from a mixture in which the large particles constitute from 70% to 90% of the total. If the mixture contains less than 70% of the large particles, the finished tube will tend to become powdery when heated and crumble, while if the mixture contains more than 90% of the large particles, the tube is apt to become deformed during the heating process and will tend to develop cracks. One form of apparatus which I have provided for casting a tube made in accordance with my invention is shown in Figure 1. It comprises a core, such as an inner cylinder or tube 10, which may be slightly tapered at one end to facilitate withdrawal after the cast is made and the surface of which may be lubricated to promote its easy withdrawal, and has spaced therefrom by means of ring 11 a tubular shell 12 which is preferably of some material such as pasteboard which can be consumed during the heating process. The slip or mixture which has been prepared as described above is then poured into the mold to form the alumina tube 13. This mixture is then allowed to dry until it will hold together, the core or inner tube 10 is removed, and the alumina tube and the shell surrounding it are placed in a furnace and fired in an atmosphere of hydrogen, preferably moist, to a temperature of 1600° for at least one hour. While satisfactory tubes have been made by firing to 1450° better tubes are obtained by firing to 1600° centigrade.

It is believed that when the tube made in accordance with my invention is fired to 1600° centigrade the minute traces of impurities on the surface of the alumina crystals act to produce a sort of binder, and that the alumina crystals grow in such a way as to form an interlocking structure. As the tube dries it shrinks and pulls together more tightly, the large particles apparently being assisted by the smaller particles to form a compact mass. The fine particles apparently act as a plastic between the larger crystals to fill up the voids and form a substantially micro-crystallized matrix for the larger crystals.

An alumina object made according to my invention is substantially pure alumina, is coherent, strong and rigid, is not easily deformed, and can safely be used in a furnace at temperatures of between 1800° and 2000° centigrade without deformation.

A cross section of the tube as viewed under a microscope with a magnification of about 250 diameters is shown in Figure 3. The structure is composed of moderately sized crystals 14 surrounded by very small closely packed particles 15, apparently sintered together and to the crystals, and forming a matrix, which seems to be micro-crystalline in structure and in which the crystals are embedded. A similar cross section of a commercial alumina tube, as it appears under a microscope with similar magnification, is shown in Figure 4. The commercial tube has a coarse, honey-comb structure of glassy or vitrified particles 16 with large, irregular voids 17. This usual type of commercial tube cannot be safely used in furnaces at temperatures above 1800° centigrade, because it is apt to become deformed. As the binder material used in the commercial tubes contains impurities which contaminate the surrounding atmosphere when the tube is heated to high temperatures, the tubes are undesirable for some purposes, such as firing refractory elements to be used in the construction of electron discharge devices. It is therefore apparent that an alumina tube made in accordance with my invention is decidedly superior to those now commercially available.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim to be new is,—

1. The method of making a substantially pure alumina object which is substantially unchanged at about 1600° centigrade which comprises making a mixture consisting of 70% to 90% of substantially pure alumina particles measuring about 75 to 100 microns across and the remainder of substantially pure alumina particles measuring from 2 to 8 microns across, adding water to make a slip just thin enough to pour and casting the slip into the desired object and firing the shaped object at from 1450° to 1600° centigrade to make it coherent and strong.

2. The method of making a substantially pure alumina object for use at high temperatures which comprises mixing substantially pure alumina particles measuring from 75 to 100 microns across and substantially pure alumina particles measuring from 2 to 8 microns across, the particles measuring from 2 to 8 microns across comprising about 20% of the total mixture, adding water to make a slip just thin enough to pour, casting the slip in the desired form and heating the object at 1600° centigrade for a period of at least one hour.

3. A coherent tube of substantially pure alumina composed of alumina crystals measuring from 75 to 100 microns across and surrounded by and embedded in a mass of alumina particles smaller than said crystals and measuring from 2 to 8 microns across and sintered together into a strong coherent mass said alumina particles completely filling the spaces between said crystals and comprising from 10% to 30% of the alumina in the tube.

4. A substantially pure alumina tube comprising 80% of alumina particles measuring from 75 to 100 microns across and the remainder of alumina particles measuring 2 to 8 microns across sintered together at a temperature of 1600° centigrade for a period of at least one hour.

5. A substantially pure alumina tube comprising 80% of alumina partices measuring from 75 to 100 microns across and 20% of alumina particles measuring from 2 to 8 microns across sintered together, said tube having a fine close-packed structure composed of moderate sized crystals embedded in a mass of very small particles of alumina.

JOHN L. GALLUP.